United States Patent [19]

Nakabayashi et al.

[11] Patent Number: 5,048,010
[45] Date of Patent: Sep. 10, 1991

[54] COMMUNICATION CONTROL PROCESSOR

[75] Inventors: Takeo Nakabayashi; hirohisa Machida, both of Itami, Japan

[73] Assignee: Mitsubishi Denki Kabushiki Kaisha, Tokyo, Japan

[21] Appl. No.: 421,872

[22] Filed: Oct. 16, 1989

[30] Foreign Application Priority Data

Nov. 11, 1988 [JP] Japan .................................. 63-285971

[51] Int. Cl.$^5$ .......................................... H04Q 11/00
[52] U.S. Cl. ................................................ 370/58.2
[58] Field of Search ..................... 370/58.1, 58.2, 85.1, 370/92; 340/825.52; 365/49

[56] References Cited

U.S. PATENT DOCUMENTS

| 3,908,092 | 9/1975 | Hight et al. | 370/59 |
| 4,389,720 | 6/1983 | Baxter et al. | 370/67 |
| 4,536,877 | 8/1985 | Livingston et al. | 370/94.1 |
| 4,608,684 | 8/1986 | Upp | 370/58.1 |
| 4,639,910 | 1/1987 | Toegel et al. | 370/67 |
| 4,641,301 | 2/1987 | Van Simaeys et al. | 370/58.2 |
| 4,879,715 | 11/1989 | Nakabayashi et al. | 370/92 |
| 4,963,862 | 10/1990 | Nakabayashi et al. | 340/825.52 |
| 4,975,873 | 12/1990 | Nakabayashi et al. | 365/49 |

OTHER PUBLICATIONS

"Semiconductor Device for ISDN", *Electronic Technology*, Aug. 1988, pp. 45-50.

*Primary Examiner*—Douglas W. Olms
*Assistant Examiner*—Melvin Marcelo
*Attorney, Agent, or Firm*—Townsend and Townsend

[57] ABSTRACT

A communication control processor for storing own data being set respectively for plural data links, and parameters related thereto or address of the other memory in which the parameters related to the data link are stored, in a CAM and address accessed by retrieval of the CAM, respectively. By retrieving the CAM according to the own data of the data link, the parameters related to the data link are to be read, updated, or cleared.

10 Claims, 3 Drawing Sheets

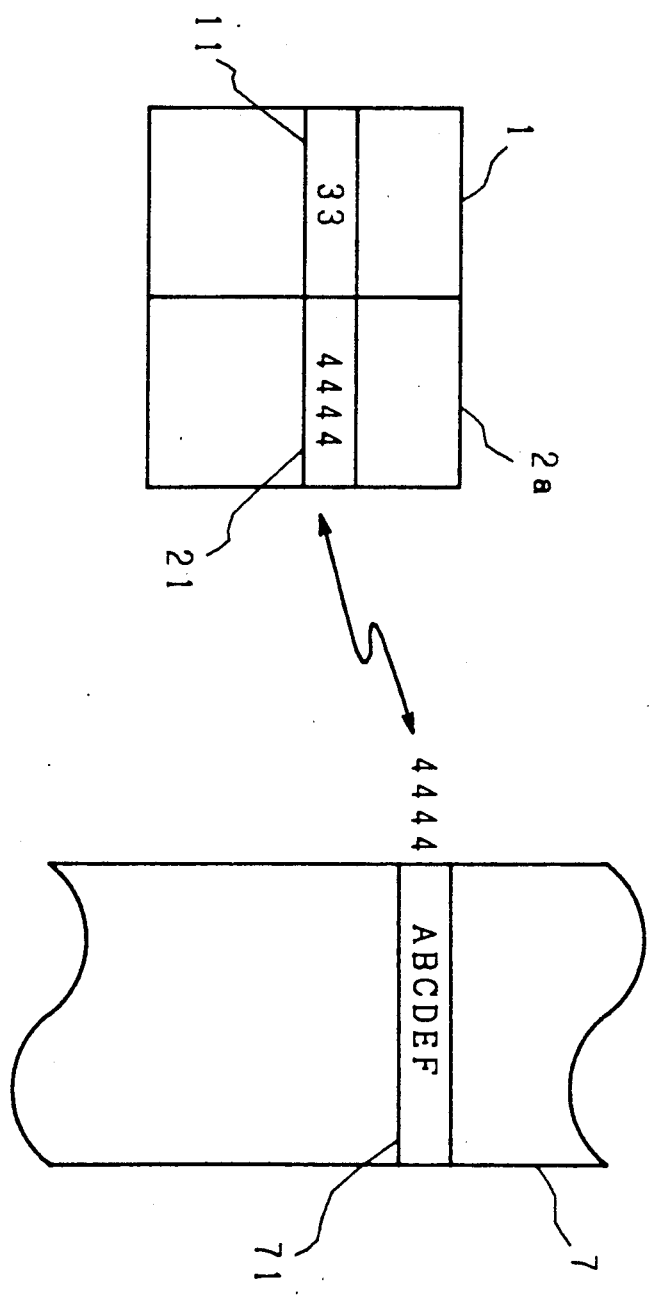

COMMUNICATION CONTROL PROCESSOR

BACKGROUND OF THE INVENTION

1. Field of the Invention

The present invention relates to a communication control processor which is capable of simultaneously creating plural data links on one transmission line, and stores data related to each link by making use of a CAM (content addressable memory).

2. Description of Related Art

FIG. 1 is a block diagram illustrating such an arrangement of a user terminal as shown in CCITT recommendation I.430, in which reference characters $TE_O \sim TE_n$ designate terminal equipments including a telephone, a facsimile and the like, respectively. The terminal equipments $TE_O \sim TE_n$ are connected to a control processor 10 through a user bus 30, respectively so that the control processor 10 can terminate a user line 40 such as a telephone line as well as it can control data transfer through the user bus 30.

In the CCITT recommendation, there are two systems of data signal for the terminal equipments and one system of various kinds of control signal in a basic interface of the user line 40. Further in the CCITT recommendation, since the maximum eight terminal equipments $TE_O \sim TE_n$ are capable of being connected to the control processor 10 if those terminal equipments $TE_O \sim TE_n$ carry out simultaneous communication via the user bus 30 having two systems of data signal, own data corresponding to each terminal equipment must be set so that plural logical data links can be simultaneously created on a pair of signal lines by time sharing processing or the like based on those own data. Therefore, it is necessary to provide one system of control signal in order to control the data transfer to and from each terminal equipment.

In the control processor 10, own data of each data link and one or plural sets of system parameters, that is, values which decide such communication conditions as transmitting and receiving states, the number of transmitting data, and the number of receiving data, are stored in a specific area of a system memory to be related with each other. When the data link is created, communication processing is undertaken by retrieval of a data link in the memory so as to read the system parameters related to the data link while software processing is undertaken by updating the system parameters so as to be returned to the system memory.

In the conventional communication control processor of such constitution as described above, when reading the parameters related to the data link to undertake the communication, all own data of the plural data links capable of being created on a transmission line and one or plural sets of parameters related to each data link stored in the system memory are accessed and then the whole area of the system memory where the parameters being stored is sequentially retrieved so as to access the own data of the required data link, which, however, results in necessitating a long time. As a result, there has been a disadvantage that when the retrieval is carried out, the bus is busy for so long time that it is difficult to realize communication control at higher speed.

In addition, irrespective of the number of the data link actually to be created, there must be ensured in the system memory a memory area in which both the own data of all the data links capable of being created and the system parameters can substantially to be stored, as a result, there has been another disadvantage that the communication system is to be uneconomical.

SUMMARY OF THE INVENTION

The foregoing disadvantages are overcome in accordance with the present invention.

It is a first object of the invention to provide a communication control processor which undertakes high-speed communication control by reading parameters related to each data link from a memory at high speed so as to reduce the time to occupy a bus.

It is a second object of the invention to provide a communication control processor which makes effective use of the memory by writing only the data related to the data link temporarily performing communication to the memory capable of reading data at high speed in which a CAM is combined with a RAM.

It is a third object of the invention to provide a communication control processor in which own data of each data link is stored in a CAM, and parameters related to each data link are stored in a location of the memory of such as a RAM accessed in consequence of the retrieval of the CAM.

It is a fourth object of the invention to provide a communication control processor in which own data of each data link is stored in a CAM, and address of the other memory storing parameters related to each data link is stored in a location of a memory such as a RAM to be accessed in consequence of the retrieval of the CAM.

It is a fifth object of the invention to provide a communication control processor wherein, when communication making use of the stored parameters has completed, those parameters are updated.

It is a sixth object of the invention to provide a communication control processor wherein, when a data link is released, data related to the released data link is to be erased.

It is a seventh object of the invention to provide a communication control processor which per se can judge whether each location of the memory is being occupied or not.

The above and further objects and features of the invention will more fully be apparent from the following detailed description with accompanying drawings.

BRIEF DESCRIPTION OF THE DRAWINGS

FIG. 3 is a conceptual view illustrating an arrangement of the other embodiment of the communication control processor in accordance with the present invention.

DESCRIPTION OF THE PREFERRED EMBODIMENTS

The embodiment of the present invention will now be described in detail with reference to the drawings.

Figure 1:
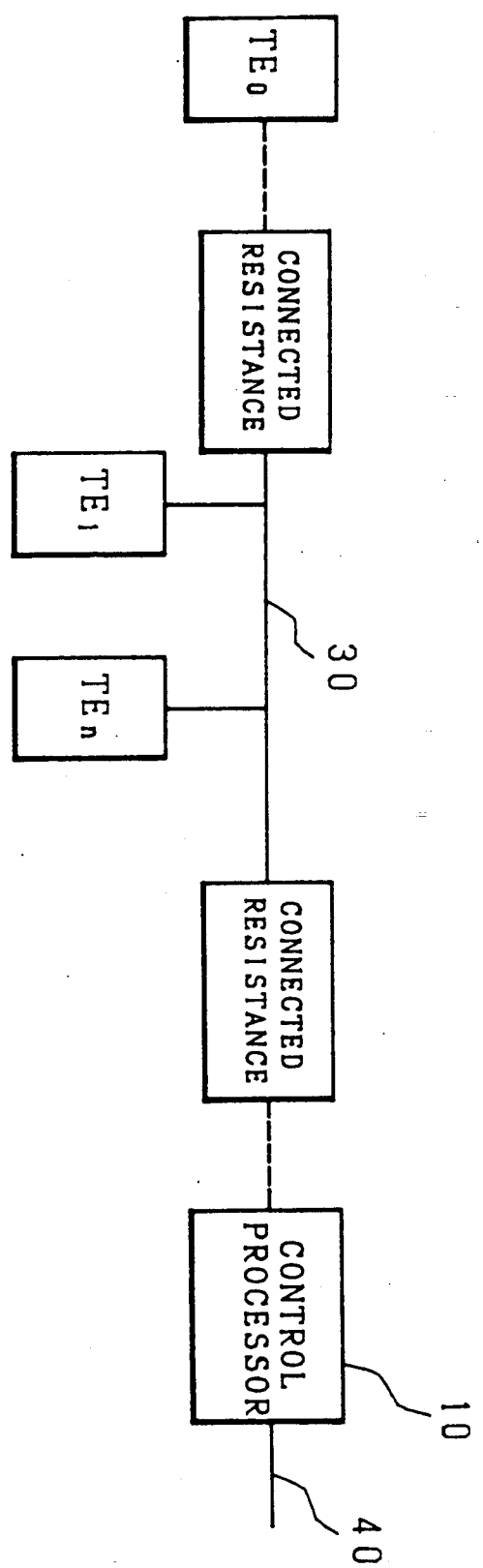
FIG. 1 is a block diagram illustrating an arrangement of a user line.
Figure 2:
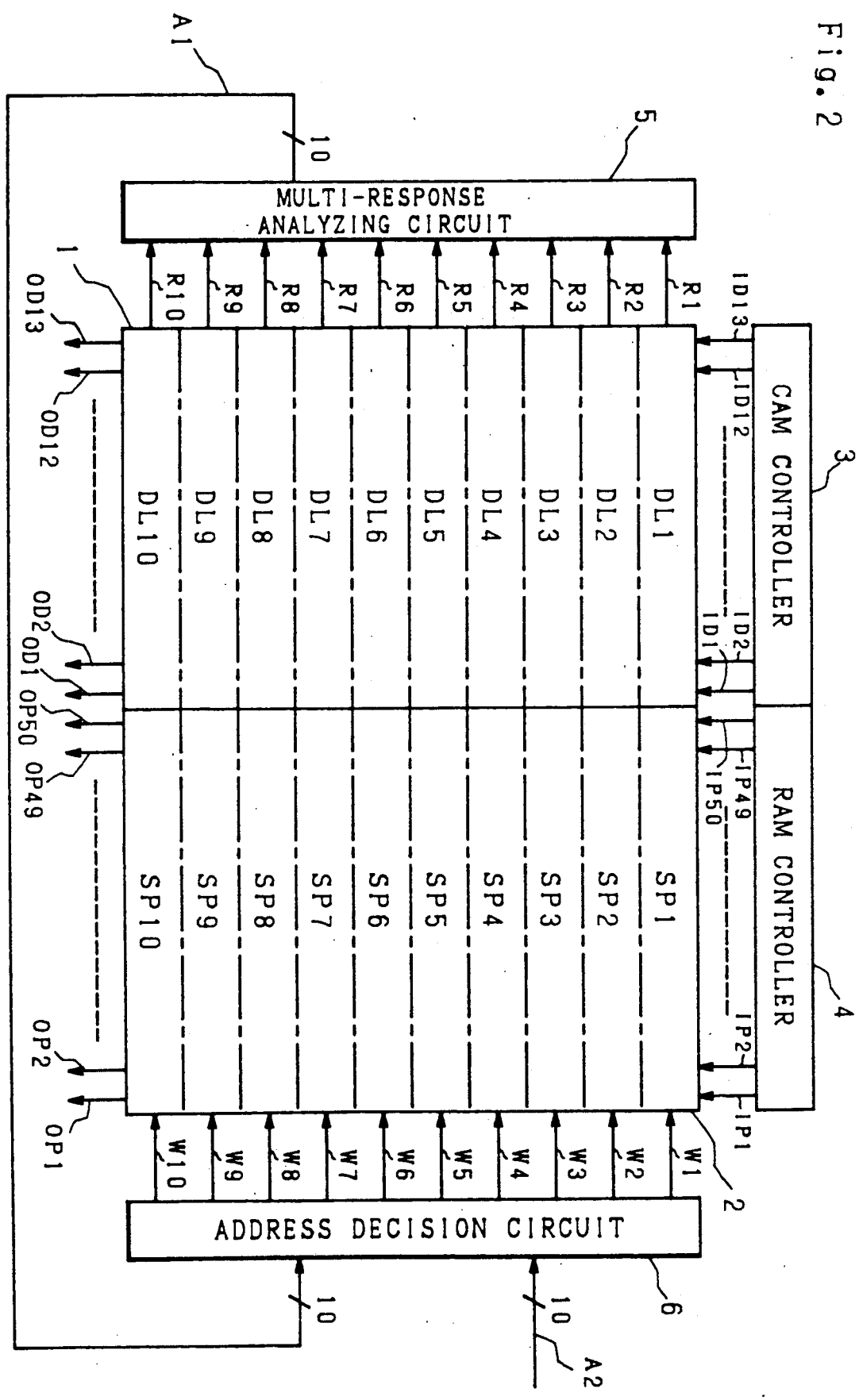
FIG. 2 is a block diagram illustrating an arrangement of a communication control processor of the present invention.

FIG. 2 is a block diagram showing an arrangement of the communication control processor in accordance with the present invention, in which data link is controlled by HDLC, whose arrangement being based on CCITT recommendation I.440 and I.441. In FIG. 2, a reference numeral 1 designates a CAM cell array composed of 10 words, one word of which is composed of 13 bits whose one bit is appropriate for one cell, wherein own data DL1~DL10 of the data link are stored in each word. A reference numeral 2 designates a RAM cell array composed of 10 words, one word of which being composed of 50 bits whose one bit is appropriate for one cell, wherein system parameters SP1~SP10 are stored respectively as well as each word is connected to each word of the CAM cell array 1 corresponding thereto. Each bit of the CAM cell array 1 is connected to a CAM controller 3 through bit lines ID1~ID13. The CAM controller 3 controls read, write, and retrieval to the CAM cell array 1. Each bit of the RAM cell array 2 is connected to a RAM controller 4 through bit lines IP1~IP50, and the RAM controller 4 controls read and write to the RAM cell array 2.

A multi-response analyzing circuit 5 being connected to each word of the CAM cell array 1 through response lines R1~R10, selects one processing out of such processings as selecting one data link, performing sequential processing, or performing processing at one time if there is found plural applicable data links after retrieval in the CAM cell array 1 is completed, and outputs an address of the data link corresponding to the selected processing through an address line A1 to an address decision circuit 6. The address decision circuit 6 being connected to each word of the RAM cell array 2 through word lines W1~W10, selects a word of the RAM cell array 2 corresponding to the address specified by the multi-response analyzing circuit 5 through the address line A1.

The own data DL1~DL10 of the data links and the parameters SP1~SP10 related thereto are outputted from both the CAM cell array 1 and the RAM cell array 2 through output lines OD13~OD1 and OP50~OP1 to the outside of the processor, respectively.

Now the operation of the communication control processor of the invention will be described below. After an operator inputs the own data of the data link, the own data is then written into a predetermined word such as an empty word of the CAM cell array 1 through bit lines ID13~ID1, and further in a word of the RAM cell array 2 connected to the above-mentioned word of the CAM cell array 1, the system parameters related to said data link are written through bit lines IP50~IP1.

When any other data link is set before the set data link is released, the own data of the data link and the system parameters are to be written in other empty areas of the CAM cell array 1 and the corresponding RAM cell array 2, respectively, in the same procedure as described above.

When the communication processing on the data link which has already been set is required, retrieval is undertaken for the CAM cell array 1 according to the own data of the data link, and after that, the CAM controller 3 outputs the own data through the data link output lines OD13~OD1 to the outside of the processor as well as the word address of the data link whose value coincided therewith to the multi-response analyzing circuit 5. If there exist a plurality of such coincided values, one processing must be selected out of such processings as selecting one data link, performing sequential processing, and performing processing at one time, and then the address of the data link corresponding to the selected processing is outputted to the address decision circuit 6 through the address line A1.

The address decision circuit 6 accesses a predetermined word of the RAM cell array 2 through word lines W1~W10 according to the address given from the multi-response analyzing circuit 5 through the address line A1 thereto, or from the outside of the processor through an address line A2 thereto. The RAM controller 4 outputs the system parameters stored in the predetermined word to the outside of the processor through the parameter output-lines OP50~OP1 so as to carry out communication processing on said data link.

When the data link is released, both the word in which the own data of said data link being stored and the parameters of the RAM cell array 2 being stored in the word corresponding to the above-mentioned word are cleared to be an empty area, and the address of the word which has become the empty area is stored in a predetermined register of the system memory so as to prepare for writing data related to a new data link.

FIG. 3 is a conceptual view illustrating an arrangement of the other embodiment of the communication control processor in accordance with the present invention. The reference numeral 1 designates a CAM cell array of 10 words wherein the own data DL1~DL10 of the data link are stored in each word, one word of which being composed of 13 bits whose one bit being appropriate for one cell. A predetermined area as large as capable of storing the system parameters is ensured in the system memory as a first RAM 7. In FIG. 3, a reference numeral with a character 2a designates a second RAM composed of 10 words, one word of which being composed of 50 bits whose one bit being appropriate for one cell, and each word thereof is connected to each word of the CAM cell array 1 corresponding thereto, in each word of the CAM cell array 1 being stored the address AD1~AD10 of said first RAM 7 in which the system parameters related to the own data DL1~DL10 in the CAM cell array 1 are being stored. Other arrangements are generally the same as the aforementioned embodiment.

FIG. 3 is a conceptual view, wherein such a state is illustrated as that own data "33" of the data link is written in a predetermined word 11 of the CAM cell array 1, and its related system parameter "ABCDEF" is written in a register 71 of the first RAM 7, then, the address "4444" of the register 71 of the first RAM 7 is written in a RAM word 21 of the second RAM 2a connected to a CAM word 11 in which the own data "33" of said data link is written.

The operation to obtain the above-mentioned state will now be described below. When the data link is set by an operator or the like, the own data "33" of the data link is written in the empty word 11 of the CAM cell array 1, and the register 71 as large as capable of storing the system parameters in the first RAM 7 is ensured so that the system parameter "ABCDEF" is written in the register 71 of the address "4444". Further, the address "4444" of the first RAM 7 is written in the RAM word 21 connected to the CAM word 11 of the CAM cell array 1 in which the own data "33" of said data link has been written.

After that, if any other data link is set before the set data link is released, the own data of the data link, the system parameters, and the address of the first RAM 7 in which the system parameters are stored, are written in other empty areas of the CAM cell array 1 and the second RAM 2a, respectively in the same way as described above.

When the communication on the data link which has been set previously is required, retrieval is undertaken for the CAM cell array 1 according to the own data of the data link, and the address of the first RAM 7 in which the required system parameters are stored is read from the word of the second RAM 2a connected to the word of the CAM cell array 1 with coincided response, after that, said address of the first RAM 7 is accessed so as to read the required system parameters, whereby the communication being carried out.

Further, in the both embodiment as described above, when communication processing with plural stages is performed in the same data link, after the communication processing at a first stage has finished, retrieval is undertaken for the CAM cell array 1 according to the own data of said data link, and then the system parameters to be applied at the next stage are written in the RAM cell array 2 or in the first RAM 7 corresponding to said data link so as to update the parameters.

Further, when the data link is released, retrieval is undertaken for the CAM cell array 1 according to the own data of said data link, and each data stored in the memory corresponding to the CAM cell array 1 with the coincided response is cleared to be an empty area.

The present embodiments are of such constitution as that the word address of CAM cell array 1 which has become empty is stored in the system memory outside the processor, however, if one bit of each CAM cell array 1 is adapted to be a flag bit in which each word is shown whether being used or not, retrieval of the empty address can be carried out inside the processor according to an examination of these flag bits, therefore, it is not necessary to assign the empty address from the outside of the processor.

Further, in this embodiment, there has been referred to such arrangements in accordance with as CCITT recommendations I.440 and I.441, in addition to them, it is possible to apply other arrangements undertaking the same processing and control so as to ensure the same effects as the present embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A communication control processor comprising:
multiplex communication means for simultaneously creating a plurality of data links on one transmission line by setting an identifier for each data link;
a CAM for storing each said identifier;
means for retrieving the CAM by said identifier;
a first memory for storing parameters related to said data links; and
a second memory for storing addresses of said first memory in which parameters related to each data link specified by each said identifier are stored in a particular address to be accessed as a result of retrieval of the CAM according to said identifier.

2. A communication control processor as set forth in claim 1 wherein data for indicating whether said particular address is being occupied or not is given to the addresses of said first memory and said second memory.

3. A communication control processor as set forth in claim 1, further comprising:
means for updating said parameters when communication making use of the stored parameters finishes.

4. A communication control processor as set forth in claim 3 wherein data for indicating whether said particular address is being occupied or not is given to the addresses of said first memory and said second memory.

5. A communication control processor as set forth in claim 1, further comprising;
means for clearing said identifier of said data link, the parameters related to said data link, and a selected address of the first memory storing said parameters when the data link is released.

6. A communication control processor as set forth in claim 5 wherein data for indicating whether said particular address is being occupied or not is given to the addresses of said first memory and said second memory.

7. A method for retrieving particular data link system parameters for a transmission line control processor controlling plural data links, comprising the steps of:
establishing a plurality of data links for a transmission line of a network with each data link having a plurality of associated system parameters and an identifier;
storing each data link's associated system parameters in a set of particular locations in a random access memory each accessed by a particular address signal;
storing each identifier for each data link in a set of particular locations in a content addressable memory;
receiving a particular data link identifier at a controller for said content addressable memory;
associatively comparing each data link identifier in said sets of particular locations in said content addressable memory with said particular received data link identifier;
asserting a match signal associated with each data link identifier for each set of said particular locations in said content addressable memory which matches said particular received data link identifier;
receiving each asserted match signal from said second memory at a multi-response analyzing circuit;
asserting a single address signal from said multi-response analyzing circuit to said random access memory; and
accessing a selected one set of said particular locations of said random access memory corresponding to said associated system parameters of said particular received data link responsive to said asserted single address signal asserted from said address decision circuit.

8. A method for retrieving particular data link system parameters for a transmission line control processor controlling plural data links, comprising the steps of:
establishing a plurality of data links for a transmission line of a network with each data link having a plurality of associated system parameters and an identifier;
storing associated system parameters for each data link in a set of particular locations in a first random access memory each accessed by a first particular address signal;
storing each first particular address signal in a set of particular locations in a second random access memory with each set of particular locations of said second random access memory accessed by a second particular address signal;

storing each identifier for each data link in a set of particular locations in a content addressable memory;

receiving a particular data link identifier at a controller for said content addressable memory;

associatively comparing each data link identifier in said sets of particular locations in said content addressable memory with said particular received data link identifier;

asserting a match signal associated with each data link identifier for each set of said particular locations in said content addressable memory which matches said particular received data link identifier;

receiving each asserted match signal from said content addressable memory at a multi-response analyzing circuit to select a particular one set of particular locations of said content addressable memory which matches said particular received data link identifier;

asserting a selected one second particular address signal from said multi-response analyzing circuit to said second random access memory;

accessing a first selected one set of said particular locations of said second random access memory corresponding to said first particular address signal of a second selected one set of particular locations of said first random access memory storing said associated system parameters of said particular received data link responsive to said asserted selected one second particular address signal asserted from said address decision circuit;

asserting said second selected one first particular address signal from said second random access memory to said first random access memory; and accessing said second selected one set of said particular locations of said first random access memory.

9. An apparatus for retrieving particular data link system parameters for a transmission line control processor controlling plural data links, comprising:

means for establishing a plurality of data links for a transmission line of a network with each data link having a plurality of associated system parameters and an identifier;

means, coupled to said establishing means, for storing each data link's associated system parameters in a set of particular locations in a random access memory each accessed by a particular address signal;

means, coupled to said establishing means, for storing each identifier for each data link in a set of particular locations in a content addressable memory;

means, coupled to said identifier storing means, for receiving a particular data link identifier at a controller for said content addressable memory;

means, coupled to said receiving means, for associatively comparing each data link identifier in said sets of particular locations in said content addressable memory with said particular received data link identifier;

means, coupled to said associative comparing means, for asserting a match signal associated with each data link identifier for each set of said particular locations in said content addressable memory which matches said particular received data link identifier;

means, coupled to said match signal asserting means, for receiving each asserted match signal from said second memory at a multi-response analyzing circuit;

means, coupled to said asserted match signal receiving means, for asserting a single address signal from said multi-response analyzing circuit to said random access memory; and means, coupled to said single address asserting means, for accessing a selected one set of said particular locations of said random access memory corresponding to said associated system parameters of said particular received data link responsive to said asserted single address signal asserted from said address decision circuit.

10. An apparatus for retrieving particular data link system parameters for a transmission line control processor controlling plural data links, comprising:

means for establishing a plurality of data links for a transmission line of a network with each data link having a plurality of associated system parameters and an identifier;

means, coupled to said establishing means, for storing associated system parameters for each data link in a set of particular locations in a first random access memory each accessed by a first particular address signal;

means for storing each first particular address signal in a set of particular locations in a second random access memory with each set of particular locations of said second random access memory accessed by a second particular address signal;

means, coupled to said establishing means, for storing each identifier for each data link in a set of particular locations in a content addressable memory;

means, coupled to said establishing means, for receiving a particular data link identifier at a controller for said content addressable memory;

means, coupled to said controller and to said content addressable memory, for associatively comparing each data link identifier in said sets of particular locations in said content addressable memory with said particular received data link identifier;

means, coupled to said comparing means, for asserting a match signal associated with each data link identifier for each set of said particular locations in said content addressable memory which matches said particular received data link identifier;

means, coupled to said match signal asserting means, for receiving each asserted match signal from said content addressable memory at a multi-response analyzing circuit to select a particular one set of particular locations of said content addressable memory which matches said particular received data link identifier;

means, coupled to said asserted match signal receiving means, for asserting a selected one second particular address signal from said multi-response analyzing circuit to said second random access memory;

means, coupled to said selected one second particular address signal asserting means, for accessing a selected one set of said particular locations of said second random access memory corresponding to said first particular address signal of a second selected one set of particular locations of said first random access memory storing said associated system parameters of said particular received data link identifier responsive to said asserted selected one second particular address signal asserted from said address decision circuit;

means, coupled to said selected one set accessing means, for asserting said selected one first particular address signal from said second random access memory to said first random access memory; and means, coupled to said selected one first particular address signal asserting means, for accessing said selected one set of said first particular locations of said first random access memory to read said system parameters from said first random access memory associated with said particular received data link identifier.

* * * * *